United States Patent

Clark et al.

[11] 4,023,307
[45] May 17, 1977

[54] TRELLIS ARM AND SUPPORT

[75] Inventors: Earl C. Clark; William L. Lewis, both of North East, Pa.

[73] Assignee: Mark Lewis, North East, Pa.

[22] Filed: May 4, 1976

[21] Appl. No.: 682,841

[52] U.S. Cl. .............................. 47/46; 174/163 R; 211/119.1; 211/119.16; 248/65; 248/219.2; 248/231; 256/47

[51] Int. Cl.² .................................. A01G 17/06

[58] Field of Search ..... 211/119.01, 119.1, 119.16; 248/353, 231, 221, 65, 49, 74, 205 R, 73; 47/42–47; 403/392, 396, 387, 397; 256/47, 57, 58, 32, 10; 174/158 R, 158 F, 161 F, 163 F

[56] References Cited

UNITED STATES PATENTS

| 1,726,878 | 9/1929 | Baum | 256/57 X |
|---|---|---|---|
| 3,136,519 | 6/1964 | Spriggle | 248/231 |
| 3,337,988 | 8/1967 | Burton | 47/46 |
| 3,391,491 | 7/1968 | Daly | 47/46 |
| 3,419,998 | 1/1969 | Burton | 47/46 |
| 3,469,343 | 9/1969 | Johnson et al. | 47/46 |
| 3,526,993 | 9/1970 | Siebol | 47/46 |

FOREIGN PATENTS OR APPLICATIONS 918,291   8/1954   Germany .................. 403/392

*Primary Examiner*—Edgar S. Burr
*Assistant Examiner*—Steven A. Bratlie

[57] ABSTRACT

A trellis arm and a support wire therefor. The arm has a hole in the first end to swingably attach the arm to a trellis post and a notch in its second end to receive the trellis wire. The support wire overlies the outer end of the arm, extends under the trellis wire and is attached to the top of the trellis post. The support wire may be in the form of a continuous loop.

Various types of trellis arms have been proposed for supporting grape trellis wires but these trellis arms have not been as simple and efficient as is desirable.

5 Claims, 9 Drawing Figures

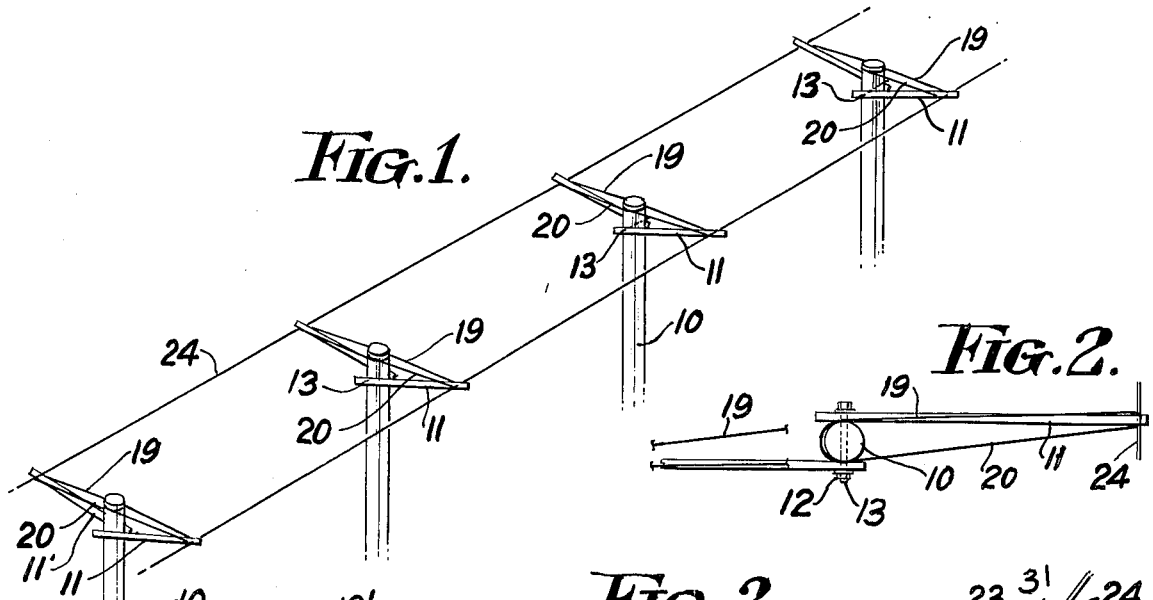
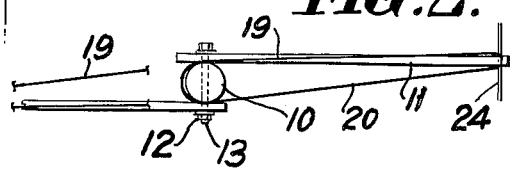
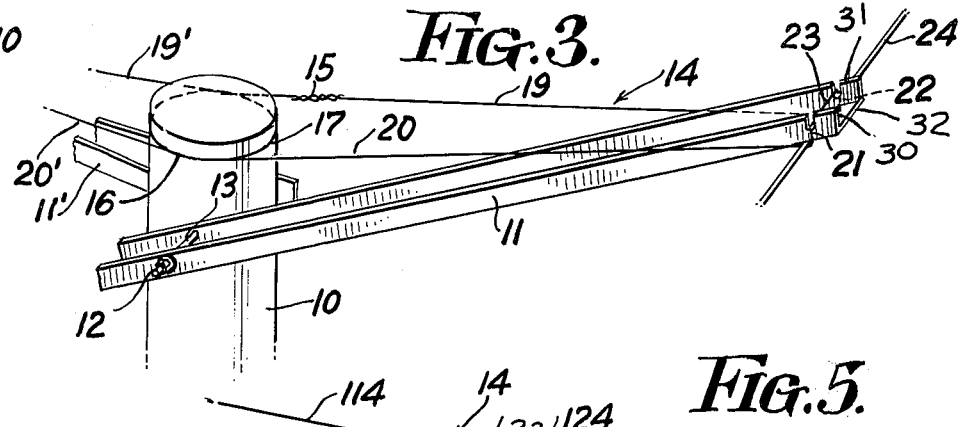
 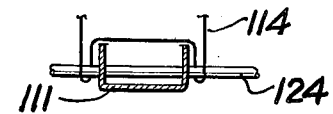
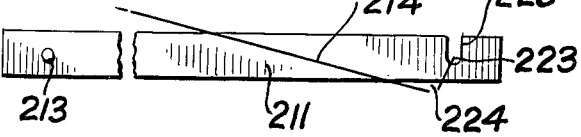 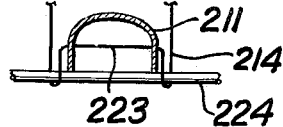
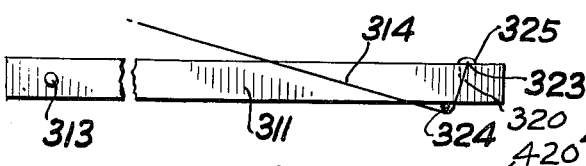
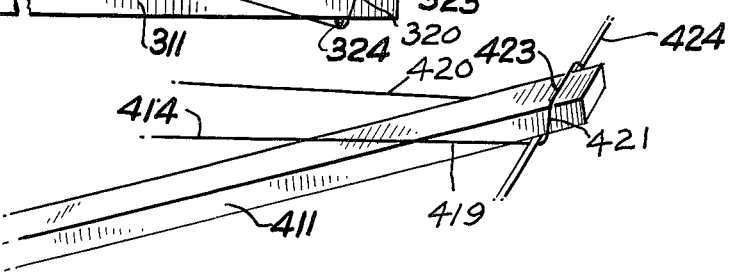

TRELLIS ARM AND SUPPORT

OBJECTS OF THE INVENTION

It is an object of the invention to provide an improved trellis arm.

Another object os the invention is to provide an improved trellis arm and support wire that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

REFERENCE TO PRIOR ART

Trellis arms of the general type referred to herein are shown in U.S. Pat. Nos. 3,337,988; 3,469,343 and 3,526,993.

GENERAL DESCRIPTION OF DRAWINGS

FIG. 1 is an isometric view of a grape trellis system according to the invention.

FIG. 2 is a top view of one of the posts and trellis arms.

FIG. 3 is an isometric view of one embodiment of the trellis arm and support.

FIG. 4 is a view of another embodiment of the trellis arm and support.

FIG. 5 is an end view of the trellis arm and support shown in FIG. 4.

FIG. 6 is a view of another embodiment of the trellis arm and support.

FIG. 7 is an end view of the trellis arm and support shown in FIG. 6.

FIG. 8 is a side view of another embodiment of the trellis arm and support.

FIG. 9 is a side view of another embodiment of the trellis arm and support.

DETAILED DESCRIPTION OF THE DRAWINGS

Now, with more particular reference to the drawings the vineyard shown has posts 10 with trellis arm 11 supported on them. The trellis arms 11 extend outwardly one from each side of the post and the end adjacent the post is provided with a bolt 12 that extends through a hole 13 in the legs of the channel-shaped support arm shown and holds the two trellis arms swingably to the post. The arms 11 are channel-shaped and have two legs 30 and 31 connected by intermediate member 32. The channels may be rounded or any other suitable shape.

Slots 21 and 22 Are formed in the legs 30 and 31 and extend downwardly toward the intermediate member 32. The support wire 14 is in the form of a continuous loop made up of the straight portions 19 and 20 that are connected together at 16 and extend around the top of the post 10 and may be spliced at 15. The wire supporting the arm 11' on the opposite side of the post 10, has the straight wires 19' and 20' extending around the top of the post 10 at 17. the trellis wire 24 rests against the under side of the channel and the wires 19 and 20 underlie the trellis wire 24, extend upwardly at 21 and 22 and are connected by the intermediate portion 23. Thus, to remove the trellis wire from the post, the operator can swing the arm 11 up slightly around the pivot 12 therby making it possible to lift the intermediate part 16 of the wire off the top of the post. The operator can then allow the wires 19 and 20 to swing down toward the arm 11 providing slack in the wire so that the portion 23 can be lifted out of the slots at 21 and 22.

In the enbodiment of the invention shown in FIG. 4, the trellis arm 111 is supported on a post by means of a bolt in holes 113. A slot 128 received the trellis wire 124 and the wire loop 114 has an intermediate part 123 that overlies the top of the arm 111 and the wire extends downwardly under the trellis wire 124 and then back up to form a loop over the top of the post.

The embodiment of the invention shown in FIGS. 6 and 7 show trellis arm 211 with a hole 213 for supporting it on a post. The slot 225 extends downwardly in the end opposite the hole 213 and this slot receives the intermediate part 223 of the wire. The wire extends downwardly therefrom and underlies the trellis wire 224, then extends upwardly at 214 to the supporting post.

The embodiment of the invention shown in FIG. 8 shows a trellis arm 311 with a pivot hole 313 for supporting it on a post. The arm has no notches in it but the wire 314 is in the form of a loop like the wire 14 and the leg 320 extends downwardly under the trellis wire 324 then up and across the top of the trellis arm at 323 and is held in place by a suitable staple or other fastener 325.

The embodiment of the invention shown in FIG. 9 is similar to that shown in FIG. 8 and trellis wire 424 underlies the trellis arm 411 and support wire 414 has the legs419 and 420 which extend up around the post supporting the trellis arm 411. The support wire 414 extends upat 421 then over arm 411 at 423.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A trellis arm and support wire comprising,
a rigid arm having a first and a second end,
means for swingably connecting said first end of said trellis arm to a post,
A trellis wire held to the underside of said second end of said arm by said support wire,
said support wire being disposed in the form of a continuous elongated loop,
one end of said loop located on the topside of said support arm near second end and extending downwardly around said trellis wire in direct contact therewith on each side of said arm of said trellis wire and thereafter extending upwardly to the other end disposed around said post whereby said trellis wire is held in engagement with said arm and said arm is supported against downward swinging.
2. The trellis arm and wire recited in claim 1 wherein said first end of said arm is swingably connected to said post by means of a pin extending through a hole in said arm.

3. The trellis arm and wire recited in claim 1 wherein at least one notch is formed in said second end of said arm and said trellis wire extends through said notch.

4. The trellis arm and wire recited in claim 1 wherein at least one notch is disposed in said second end of said arm and said support wire extends through said notch.

5. The trellis arm and wire recited in claim 1 wherein means is provided for fastening said support wire to said second end of said arm.

* * * * *